United States Patent
Chen et al.

(10) Patent No.: US 12,193,113 B2
(45) Date of Patent: *Jan. 7, 2025

(54) BULK DATA PROCESSING SYSTEM

(71) Applicant: AT&T Intellectual Property I, L.P., Atlanta, GA (US)

(72) Inventors: Letian Chen, Chesterfield, MO (US); Baofeng Jiang, Pleasanton, CA (US); Christopher Du, San Ramon, CA (US); Yew-Aik Lim, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/952,842

(22) Filed: Sep. 26, 2022

(65) Prior Publication Data

US 2023/0017131 A1 Jan. 19, 2023

Related U.S. Application Data

(63) Continuation of application No. 17/060,725, filed on Oct. 1, 2020, now Pat. No. 11,490,247, which is a continuation of application No. 16/286,223, filed on Feb. 26, 2019, now Pat. No. 10,834,578.

(51) Int. Cl.
| | | |
|---|---|---|
| *H04W 8/26* | (2009.01) | |
| *H04L 67/55* | (2022.01) | |
| *H04W 8/08* | (2009.01) | |
| *H04W 8/18* | (2009.01) | |
| *H04L 101/654* | (2022.01) | |

(52) U.S. Cl.
CPC ............. *H04W 8/26* (2013.01); *H04L 67/55* (2022.05); *H04W 8/08* (2013.01); *H04W 8/186* (2013.01); *H04L 2101/654* (2022.05)

(58) Field of Classification Search
CPC ......... H04W 8/08; H04W 8/186; H04W 8/26; H04W 24/10; H04W 24/08; H04L 61/6054; H04L 67/2823; H04L 67/26
See application file for complete search history.

(56) References Cited

U.S. PATENT DOCUMENTS

| | | | |
|---|---|---|---|
| 7,962,582 B2 | 6/2011 | Potti et al. | |
| 8,266,327 B2 | 9/2012 | Kumar et al. | |
| 9,887,883 B2 | 2/2018 | Robitaille et al. | |
| 9,954,736 B2 | 4/2018 | Durgin et al. | |
| 10,111,198 B2 | 10/2018 | Lian et al. | |
| 2011/0312328 A1* | 12/2011 | Choi | H04L 5/0091 455/450 |
| 2014/0274149 A1* | 9/2014 | Alfalujah | G01S 5/0252 455/456.3 |
| 2015/0262421 A1* | 9/2015 | Bell | G06T 3/40 345/423 |
| 2017/0373950 A1 | 12/2017 | Szilagyi et al. | |

FOREIGN PATENT DOCUMENTS

WO 2015113636 A1 8/2015

* cited by examiner

*Primary Examiner* — Wei Zhao
(74) *Attorney, Agent, or Firm* — Guntin & Gust, PLC; Mark Wilinski

(57) ABSTRACT

The system allows real time collection and processing of massive data from many network elements. It has an elastic architecture that scales horizontally to support different network sizes. The system in a uniform data format for downstream consumption. It employs a pub/sub data distribution mechanism that supports multiple concurrent downstream subscribers efficiently in real-time.

20 Claims, 7 Drawing Sheets

BULK DATA PROCESSING SYSTEM

CROSS-REFERENCE TO RELATED APPLICATIONS

This application is a continuation of U.S. patent application Ser. No. 17/060,725, filed on Oct. 1, 2020, which is a continuation of U.S. patent application Ser. No. 16/286,223, filed on Feb. 26, 2019 (now U.S. Pat. No. 10,834,578). All sections of the aforementioned application(s) and patent(s) are incorporated herein by reference in their entirety.

BACKGROUND

A service provider's network (e.g., mobility radio access network) contains many network elements that produce massive amount of performance and trace data. The data may be essential for the service provider to monitor and maintain the health and performance of the entire network. The data may also be critical to identify optimization opportunities to improve operational efficiency and customer experience. This disclosure is directed to addressing issues in the existing technology.

SUMMARY

The system and method provided herein allows real time collection and processing of massive data from many network elements. It has an elastic architecture that scales horizontally to support different network sizes. It has a flexible ingestion layer that adapts to various input data sources with different data formats (e.g., Abstract Syntax Notation-ASN.1, protocol buffers, proprietary binary) and data transport mechanisms (e.g., file based, UDP, TCP streaming) It outputs in a uniform data format for downstream consumption. It employs a pub/sub data distribution mechanism that supports multiple concurrent downstream subscribers efficiently in real-time.

In an example, an apparatus may include a processor and a memory coupled with the processor that effectuates operations. The operations may include obtaining data from a network device, wherein the network device processes data from a wireless network; determining a type of the data from the network device; based on the type of data, transforming the data into a standardized format; partitioning the data into chunks based on the type of network device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

There are multiple issues associated with conventional data processing systems. With regard to a first issue, for many use cases (such as real-time radio access network optimization), the data should be collected and processed with minimal end-to-end latency. The sheer amount of the data coupled with the low latency collection requirement poses challenge to conventional systems. Conventional systems usually use file transfer as the collection mechanism, and output collected data as files for downstream systems to consume. The file-based mechanism usually cannot handle large scale of data processing in a near real-time fashion.

With regard to a second issue, the radio access network (RAN) typically comprises of network elements from multiple vendors. Each vendor employs different mechanism for transmitting performance data (e.g., file based or UDP). In addition, the produced data from each vendor may have different formats (e.g., ASN.1, Protobuf, proprietary binary). The vendors can also update the format and transmission mechanism at its own release schedule, which requires the collection system to adapt to the change quickly. It is challenging for conventional systems to handle heterogeneous data produced by different vendors. The past collection systems are fragmented in architecture, with parallel systems (usually vendor provided) created to handle each vendor's network element separately. The fragmented collection systems pose an issue to downstream applications, as the downstream applications are exposed to different output data formats and distribution methods mandated by the fragmented collection systems. With regard to a second issue, the performance data collected may be needed by multiple downstream systems with a low latency requirement. Each downstream stream might be interested in a subset of the performance data, for example, data from a geographical region, or traces related to certain procedures. It is challenging in conventional systems to allow each downstream system to get the data it needs in an efficient way without duplicating data for each downstream system. Conventional data processing systems usually create duplicated dedicated file storage for each downstream application, which may be inefficient with regard to storage and computing.

The system and method provided herein allows real time collection and processing of massive data from many network elements. It has an elastic architecture that scales horizontally to support different sizes of network. It has a flexible ingestion layer that adapts to various input data sources with different data formats (e.g., ASN.1, protocol buffers, proprietary binary) and data transport mechanisms (e.g., file based, UDP, TCP streaming) It outputs in a uniform data format for downstream consumption. It employs a pub/sub data distribution mechanism that supports multiple concurrent downstream subscribers efficiently in real-time.

Figure 1:
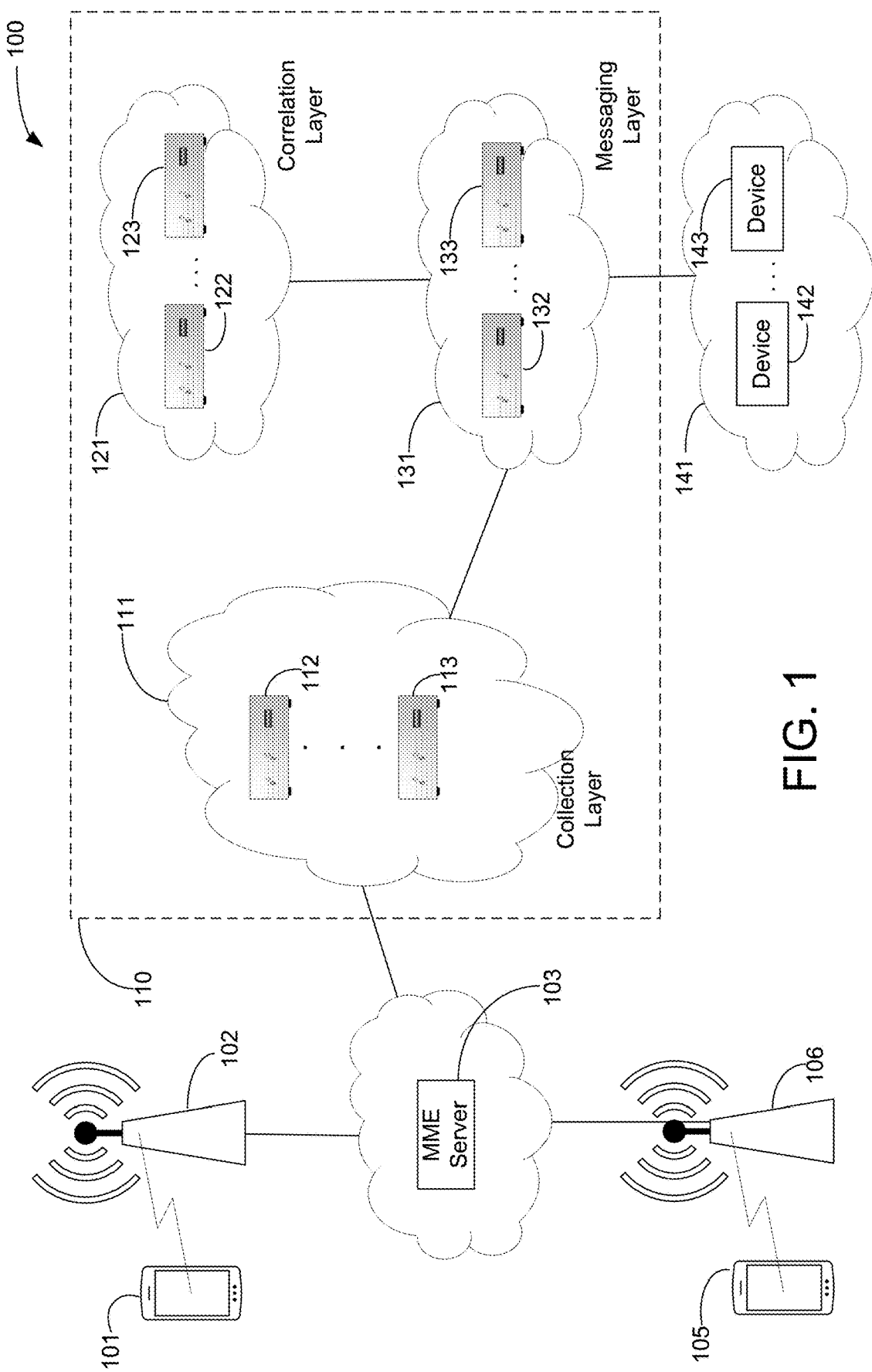
FIG. 1 illustrates an exemplary system for implementing bulk data processing.

FIG. 1 illustrates an exemplary system 100 for implementing bulk data processing. As shown, there may be mobile device 101 or mobile device 105 (e.g., laptop, tablet, internet of things devices), which may be connected with eNodeB 102 or eNodeB 106. Mobility Management Entity (MME) 103 may be connected with STreaming Events and Mediation (STEM) layer 110, which may include a network of servers with different sub-layers (e.g., collections of servers—network 111, network 121, network 131) that process data in a particular manner, as disclosed in more detail herein. Network 111 may include devices, such as server 112 or server 113, which process data for a collection layer. Network 121 may include devices, such as server 122 or server 123, which process data for a correlation layer. Network 131 may include devices, such as server 132 or server 133, which process data for a messaging layer. Network 141 may include devices, such as device 142 or server 143, which process data for an application layer. The elements of system 100 may be communicatively connected with each other.

Figure 2:
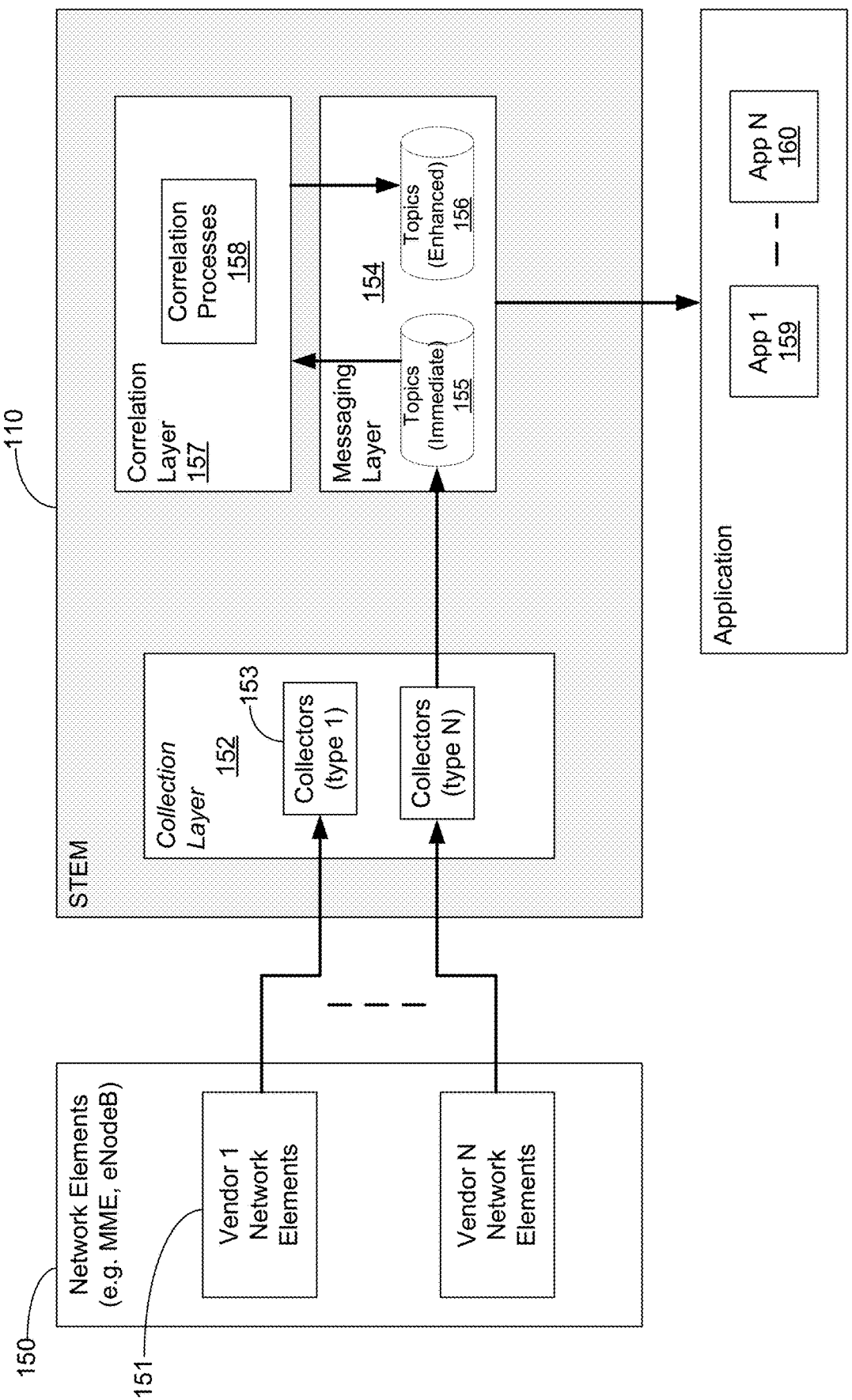
FIG. 2 illustrates an exemplary block diagram of a system for implementing bulk data processing.

FIG. 2 illustrates an exemplary block diagram of a system for implementing bulk data processing. Similar to FIG. 1, there may be multiple network elements in network element block 150, such as network element 151. Network element 151 may include MME 103, eNodeB 102, or other network elements. Network element 151 may interface with collection layer 153 of STEM layer 110. As shown in FIG. 2, STEM layer 110 may include collection layer 152 (e.g., network 111), correlation layer 157 (e.g., network 121), or messaging layer 154 (e.g., network 131). Collector layer 152 may include one or more collectors, such as collector 153 (e.g., server 112 or server 113). The elements of FIG. 2 may be communicatively connected with each other and may include virtual machines or physical apparatuses.

Collector 153 may be used for obtaining (e.g., collecting) data from network elements, such as network elements of network element block 150. There may be multiple types of collectors in collector layer 152. Each type of collector 153 may be designed to handle data ingestion for a specific vendor data format and transmission mechanism. Depending on the mechanism involved, collector 153 may obtain the data and performs initial decoding of the data. For example, name brand provider's (also referred herein as vendor) cell traffic recording (CTR) data collected from the name brand provider's eNodeBs is encoded as binary in a proprietary format of the name brand provider, while collector 153 may decode the binary data into ASCII strings that may be easier to utilize. The initially decoded data may be published to the messaging layer as individual messages. The different type of adapters outputs a uniform format (e.g., uniform content) of data insulating the downstream from the variance among vendor data formats. When a new vendor is introduced, a new adapter may be relatively quickly added to obtain the data without impact to the downstream application. Each type of adapter may act independent of each other. The adapter may be updated (e.g., software update) for one type of adapter without impact to another type of adapter. When a vendor's data format/transport mechanism changes, the software for the adapter may be updated to maintain backward compatibility in the output data. For example, a vendor may decide to change the data unit for one data field from milliseconds to microseconds. The uniform format exposed to the downstream system may also use milliseconds, and does not need to be changed. The adapter code may handle the variable in the input, and maintain the output units. The downstream systems may also stay the same without changing.

As disclosed herein, collection layer 152 may have multiple servers. The adapters may be deployed as needed on the servers. More adapters or servers may be added when data volume increases. In addition, the data that is obtained from network elements box 150 may be load balanced across collectors, which may allow the servers of collector layer 152 to have increased availability. The adapter here means a specific type of collector 153 that is capable of handling (collecting and decoding) a specific vendor's data. There are differences in input data provided by different vendors, such as data field sequence, data unit. The various adapters convert the vendor specific format data into a "uniform" format data that the downstream system uses. When a new vendor is introduced, a new adapter is written to convert the new vendor specific data format into the "uniform format" (e.g., standardized format), and this insulates the downstream system from the impact of having to integrate with the vendor specific format data.

Messaging layer 154 may be used for data storage or distribution. Messaging layer 154 may employ a real-time publication-subscription messaging paradigm. In software architecture, publish—subscribe is a messaging pattern where senders of messages, called publishers, do not program the messages to be sent directly to specific receivers, called subscribers, but instead categorize published messages into classes (e.g., topics) without knowledge of which subscribers, if any, there may be. Similarly, subscribers express interest in one or more classes and only receive messages that are of interest, without knowledge of which publishers, if any, there are. For data generated by mobility radio access network, geographical identifiers, such as eNodeB ID, cell ID, MME ID, tracking area code can be used as classifiers for dividing the data into classes. Also the data can be partitioned based on the event type of the data during the user's call session, such as RRC connection setup, hand over, Initial context setup, or UE context release.

As shown in FIG. 2, messaging layer 154 may include multiple topics and types of topics (e.g., immediate topic 155 or enhanced topic 156). The topics may be created according to a partitioning scheme that breaks the total data volume to a manageable size per topic (e.g., manageable chunk). The "partitioning scheme" may be flexible and include multiple criteria as to how the data may be partitioned into manageable chunks. For example, for vendor1 CTR data, the total volume for a service provider's network center in an area (e.g. city or block), amounts to 3 Gbps, which is around 32.4 TB data per day. The data may be partitioned into different topics by events (around 20 events), and then by last two digits of the eNodeB ID (100 combination). Using this scheme, the daily volume per topic may be 16 GB data per day, which may be easier to handle. The flexible partitioning scheme here may be different based on the data being handled on a case-by-case basis.

Immediate topics 155 may be associated with holding the "immediate" processing results directly from collection layer 152. The immediate topics may be topics holding decoded raw data from a single source—data without being significantly correlated or enhanced from other data sources. For example, vendor1 CTR data coming from eNodeBs (e.g., eNodeBs based on location area, type of traffic handled, MME connections to eNB, or cell IDs) may be placed into multiple CTR related immediate topics after the data is decoded. Vendor cell trace user equipment (UE) mapping (CTUM) data coming from MMEs may be placed into its own immediate topics Enhanced topics 156 may be associated with holding further processed "enhanced" results after further processing by correlation layer 157. Enhanced topics may hold correlated data from multiple sources. For example, vendor1 CTR data may have S1AP ID, but does not include International Mobile Subscriber Identity (IMSI), which uniquely identifies the customer, and may be important for a downstream system. Vendor1 CTUM data may hold the proper mapping from S1AP ID to IMSI. The collection system's correlation layer may correlate (or otherwise match) the data from the two sources, and add the IMSI to the CTR data and place the enhanced CTR data to the enhanced topics The topics may be subscribed to by downstream applications to consume. For example, a downstream application for calculating cell boundaries may subscribe to topics containing handover events only, and consume the "timing advance" fields in the events. Servers (e.g., message brokers) in messaging layer 154 may group into clusters (e.g., network 131) to support the topics. For example, messaging layer may have servers that are dedicated to immediate topics or separate servers dedicated to enhanced topics, or the like. The immediate topics may be placed on a separate cluster of servers than the enhanced topics. This way, if the enhanced topics has more usage than the immediate topics, more servers may be put on the cluster holding the enhanced topics. Message brokers may be added to the clusters so the capacity may grow as the need grows.

Correlation layer 157 may be used to further process the decoded messages published (e.g., sent) by collection layer 152. Correlation layer 157 further processes the decoded messages published by collection layer 152. One example is given above for IMSI tagging, which is to add IMSI information to vendor CTR data. In another example, the vendor1 CTR data is event based, and for a single call session, multiple events are generated, and sent to the bulk data collection for processing. For CTR data, there are multiple events generated by the eNodeBs during the customer's call session, such as RRC connection setup, RRC measurement report, ERAB setup, ERAB release, Initial context setup, UE context release. These multiple events reflect the progress of the customer's call session, and contains performance information reflecting the quality of the call. These multiple events land on the immediate topics. The correlation layer may correlate (or otherwise match) them together by subscribing to all the relevant immediate event topics, and generate a summary data record for the entire session. The generated data record may be placed into a separate "enhanced" data topics.

Processes running on correlation layer 157 may subscribe to the immediate topics of interest, for example, then may further process the messages received to output the result to a different set of enhanced topics. The downstream applications may subscribe to the topics of interest. Correlation layer 157 may have multiple servers, where each server subscribes to a subset of the topics. More servers may be added when volume increases. This helps with horizontal scalability. Horizontal scalability is the ability to increase capacity by connecting multiple hardware or software entities so that they work as a single logical unit by adding more of the same hardware/software entities without the need of changing the existing architecture.

Figure 3:
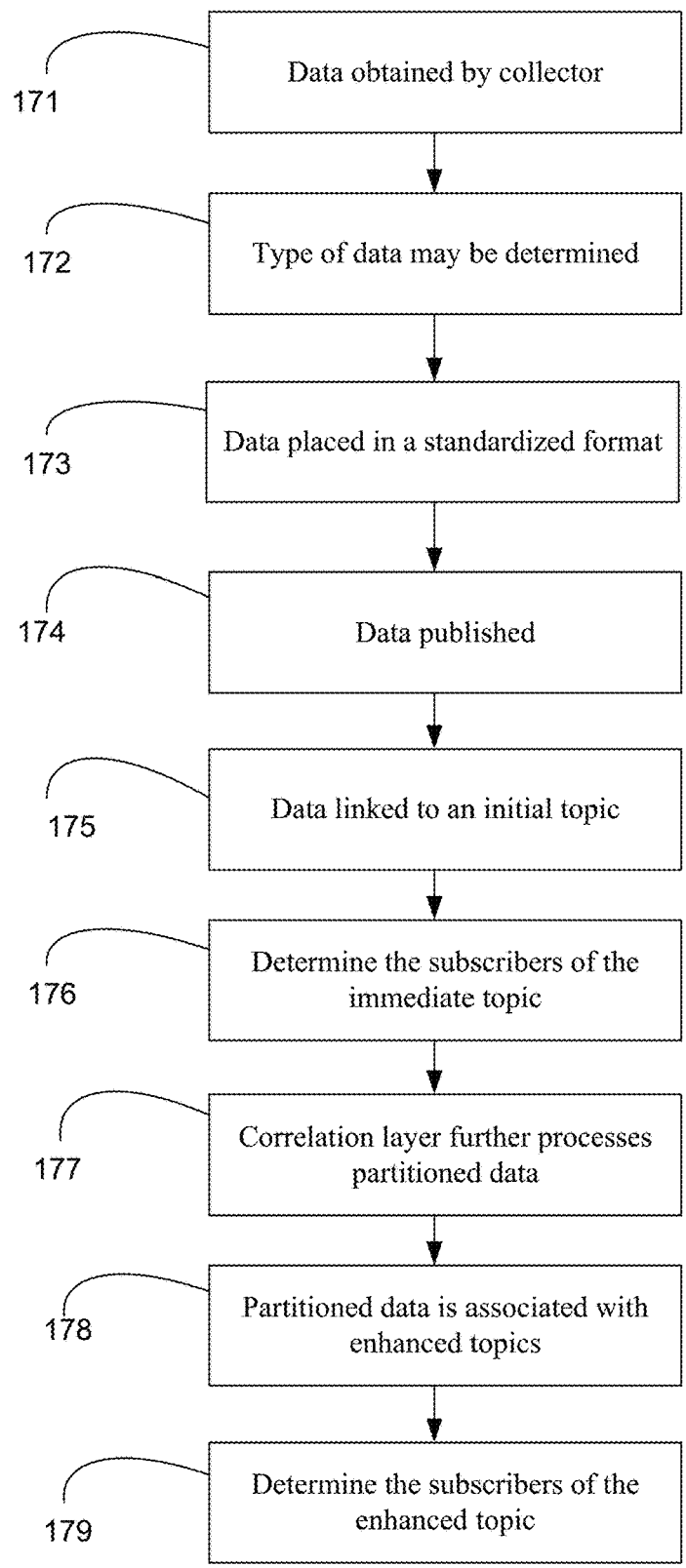
FIG. 3 illustrates an exemplary method for implementing bulk data processing.

FIG. 3 illustrates an exemplary method for implementing bulk data processing. The examples given herein, such as adding IMSI to the CTR data collected, may apply here. At step 171, data may be obtained by collector 153 from a network element, such as network element 151. For example, the data that may be obtained from network element 151 and the data may include radio performance, throughput, which cell mobile devices are camped on, which cell mobile devices handover to, when mobile devices start to use a service (e.g., mobile device attaching to the cell site which may be an indicator of when the mobile is being used), or when mobile device communication with network element 151 ends (e.g., release contact). The data collected may be sent via TCP or UDP in a streamed fashion. At step 172, the type of data may be determined by collector 153. The type of data may be associated with the data being a vendor specific format, the associated device source (e.g., MME or eNB) of the data, or a unit (e.g., measurement unit) of the data, among other things. At step 173, based on the type of data the data may be placed in a standardized format, such as a standardized format rather than a specific vendor format. At step 174, the data in the standardized format is published (e.g., sent) to messaging layer 154. At step 175, the data in the standardized format of step 174, when received by messaging layer 154, is linked with an initial (e.g., immediate) topic. The data in the standardized format may be partitioned into manageable sizes (e.g., chunks) per topic. Once published to the topics, the data may be accessible via subscription or stored in the topic. There may be triggers, such as a threshold time, amount of data, identifier of a device, identifier of type of data, or the like, that triggers how long data may stay stored in the topic before removal.

At step 176, at the time after the initial association of the topic to the data and the partitioning (see step 175), messaging layer 154 may immediately determine the subscribers of the immediate topic that match their subscription and send data per the subscription as it pertains to the immediate topic. As mentioned above, the RAN (Mobility Radio Access Network) data can usually be partitioned based on the geographical network topology (cell ID, eNodeB ID, tracking area code), or the event types. There could be other ways of partition too based on the customer group (deduced from IMSI), device type (deduced from IMEI).

At step 177, the partitioned data associated with the immediate topic may be further processed by correlation layer 157. Correlation layer 157 may be subscribed to particular immediate topics and based on the generation of partitioned data set of a particular immediate topic, and then messaging layer 154 may send partitioned data to correlation layer 157 for processing. For example, immediate topic X may be generated into enhanced topic Y because there is a determination that for the topic to be of value to downstream application to extract value from partitioned data associated with a particular virtual network function, an IMSI should be included. Therefore, an IMSI may be attached and previous immediate topic data may now be associated with an enhanced topic based on the particular VNF that includes IMSIs. Potential VNF can be virtual MMEs, or virtual SGW, PGW. At step 178, based on correlation of step 177, messaging layer 154 obtains correlated partitioned data that is associated with enhanced topics. At step 179, at the time after the association of the enhanced topic to the partitioned data (see step 177) with an immediate topic, messaging layer 154 may immediately determine the subscribers (e.g., one or more applications on the devices) of the enhanced topic that match the factors for the subscription and send data per the subscription as it pertains to the enhanced topic. Some examples of downstream applications interested in getting the RAN data with the customer identifier (IMSI) are geolocation tracking, video streaming optimization, targeted ads insertion.

For the IMSI tagging use case, the "enhanced" topics may be created based on a combination of data event types and the last two digits of the eNodeB IDs, as an example. After each data message is enhanced (with IMSI information added), it is placed onto one of the enhanced topics based on the message event type and the last two digits of the eNodeB IDs. For other potential use cases, the "enhanced" topics can be partitioned according to topology identifiers (e.g., as cell ID, eNodeB ID), tracking area code, user groups (based on IMSI), or device types (based on IMEI), among other things.

The below discussion provides additional perspective with regard to the subject matter disclosed herein. A service provider may have many thousands of network elements, such as eNBs, and may handle many operations (e.g., calls). For example, eNB 102 may handle calls from thousands of mobile devices and eNB 102 may collect a lot of information while those calls are in progress and try to send the information to a process assistant. STEM 110 may act as a process assistant allows data to be processed more quickly (e.g. near real-time), while exposing the processed data to downstream applications for further use. The conventional challenge here is how to efficiently collect and use data of a large-scale service provider network, which may have tens of thousands of eNBs and processes millions to billions of calls or other operations at the same time. For example, each of those calls may generate events in which each event may be associated with one or more messages that carry data that the downstream system needs. STEM 110 may have multiple layers, which allows for the system to be elastic in handling the growing use of the network.

STEM 110 is a way to expose the data downstream and to be able to process it at near real time in order to make potentially significant use of the data. STEM 110 includes a scheme for dividing the data into different categories (e.g., topics). Mobility traffic changes on the fly, so without this disclosure's near real-time processing capability, conventional systems are not able to optimize and monitor the network performance (or the user equipment (UE) performance) in real-time, which may be significant. The near real-time data may be used for load-balancing, directing traffic to other devices (e.g., routes to network devices), predict the throughput, or change network device settings for more bandwidth for a particular communication (e.g., call or data connection), among other things. Often when conventional systems are used, by the time the decision is made the conditions have already significantly changed.

With the bulk data processing system disclosed herein, service providers can collect and process real-time performance data and network health data of its entire network. This enables continuous monitoring and optimization of the network, and improves operational efficiency and customer experience. The architecture can scale horizontally to handle different size of data collection needs, and capable of handling very large volume of data collection. More servers can be added to each layer of the architecture (collection, grouping (e.g., correlation, mediation, or matching), and messaging) according to the need.

Further, the use of real time publication-subscription paradigm internally ensures data collected may be processed or distributed on a per message level at real time. It allows the collection system to minimize the end-to-end latency so that downstream applications may get the data quickly to fulfill real-time use cases. The disclosed subject matter supports data collection from multiple vendors. This avoids data fragmentation. Data from different vendors may be harmonized into a uniform format for downstream consumption. This also insulates downstream application from vendor data format change. The disclosed subject matter supports sharing data with multiple downstream applications efficiently. Each downstream system may get the portion of the data it needs without added storage or compute required from the disclosed data collection system.

A difference between the conventional systems and the disclosed bulk collection is that previously data was stored in a series of files produced periodically, e.g., a single file per 5 minutes. So the conventionally created data records in the file may only be made available to the downstream when the file is finished generating. With the real-time publishing or subscribing, each data record may be published immediately after it is produced and made available for consumption.

The new bulk data processing system is backward compatible with the old system and capable of consuming file based input, as well as streaming data input. Streaming data may be considered data that is continuously generated, which may be by different sources. Data streaming can also be explained as a technology used to deliver content to devices over a network that allows for immediate to access the content, rather than having to wait for it to be downloaded. Data lake refers to the storage of a large amount of unstructured and semi data, and is useful due to the increase of big data as it can be stored in such a way that firms can dive into the data lake and pull out what they need at the moment they need it. Whereas a data stream can perform real-time analysis on streaming data, and it differs from data lakes in speed and continuous nature of analysis, without having to store the data first. A stream may be thought of as items on a conveyor belt being processed one at a time rather than in large batches. Streams may be processed differently than batch data.

Figure 4:
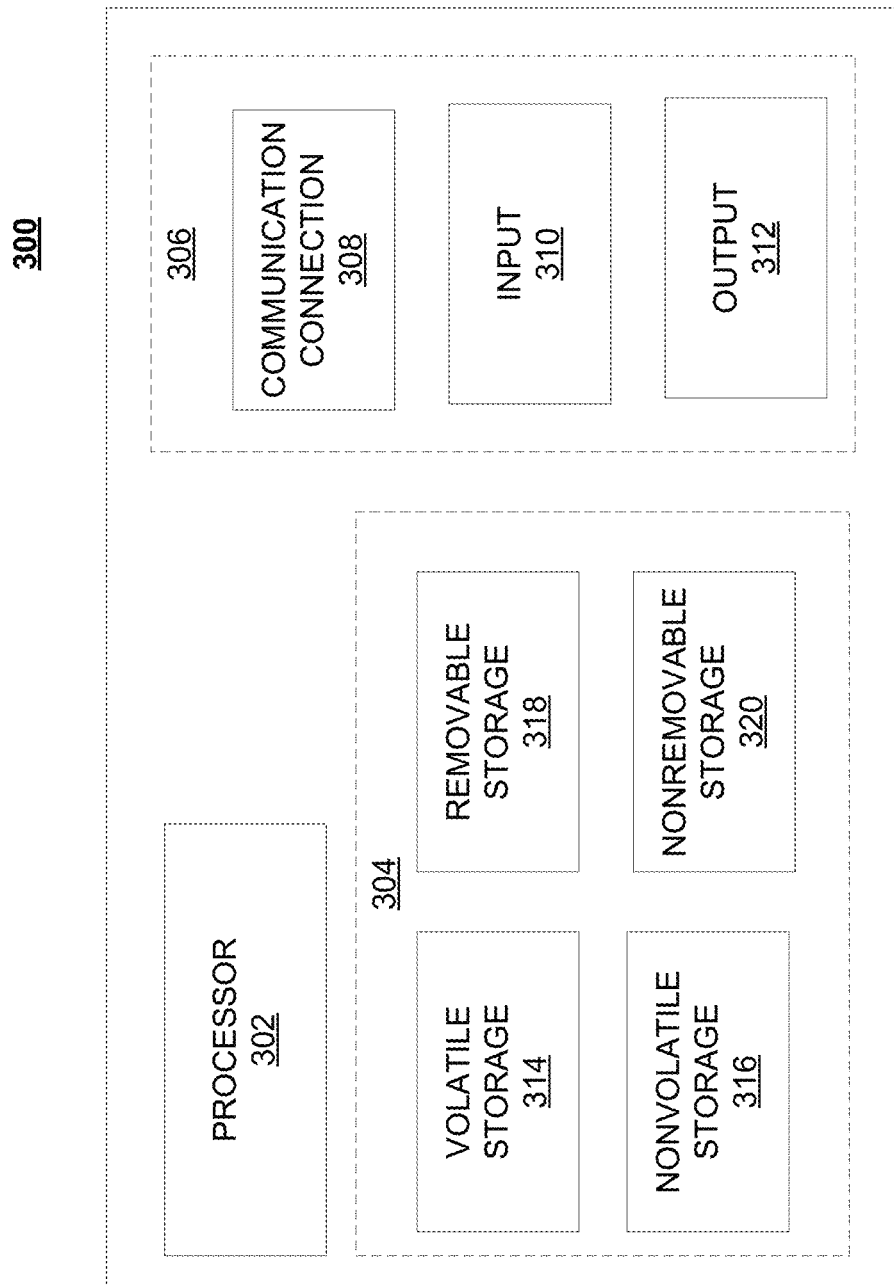
FIG. 4 illustrates a schematic of an exemplary network device.

FIG. 4 is a block diagram of network device 300 that may be connected to or comprise a component of FIG. 1 or FIG. 2. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
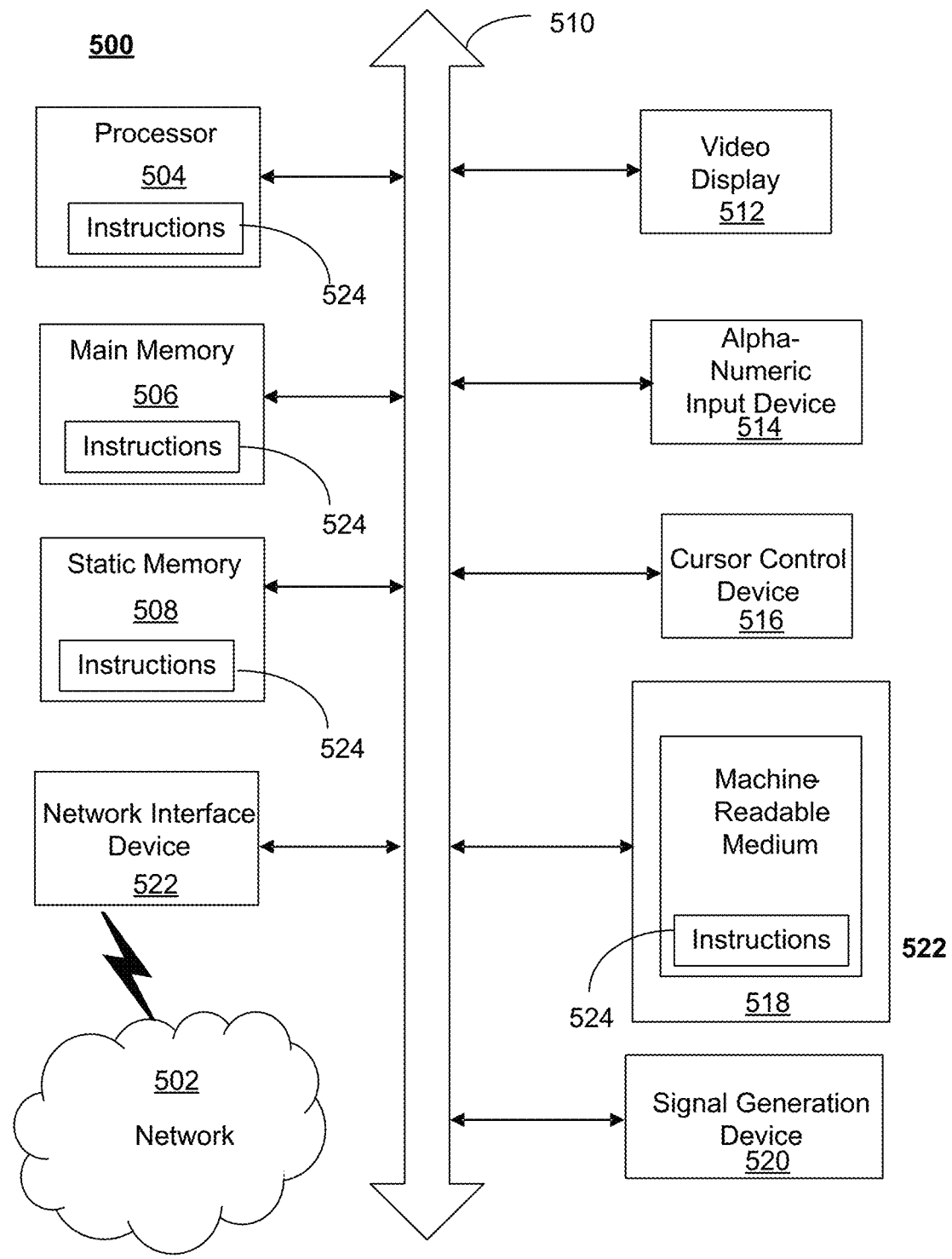
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, server 112, mobile device 101, eNB 102, MME 103, and other devices of FIG. 1 and FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, internet of things (IOT) device (e.g., thermostat, sensor, or other machine-to-machine device), or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6A:
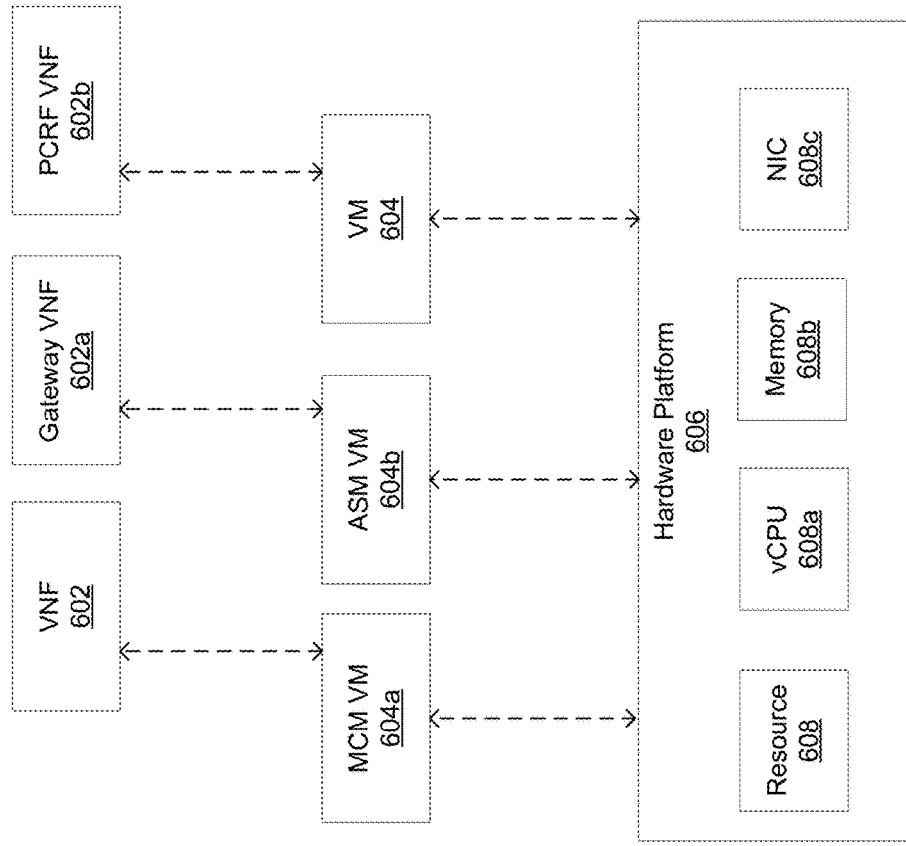
FIG. 6A is a representation of an exemplary network.

FIG. 6A is a representation of an exemplary network 600. Network 600 (e.g., network 111) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 6A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 6A illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 6B:
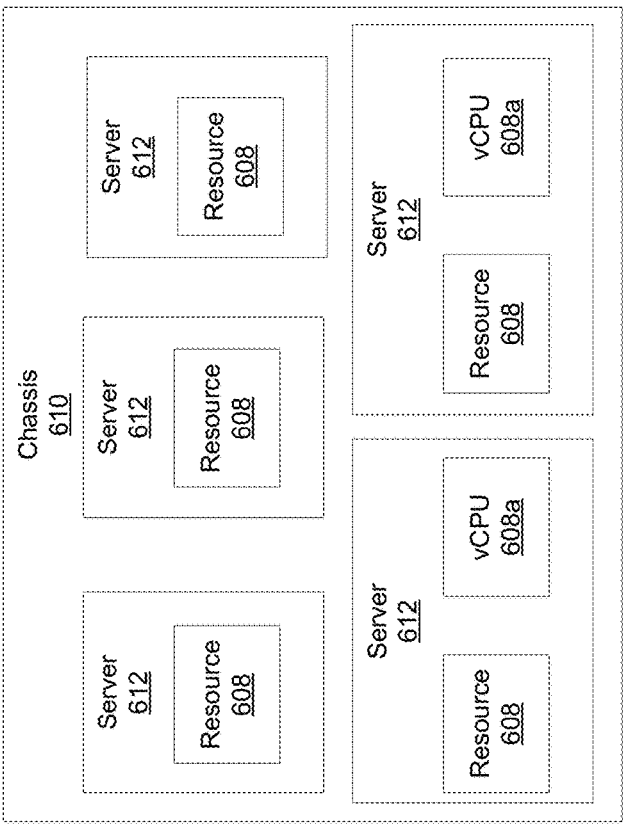
FIG. 6B is a representation of an exemplary hardware platform for a network.
Figure 6B:
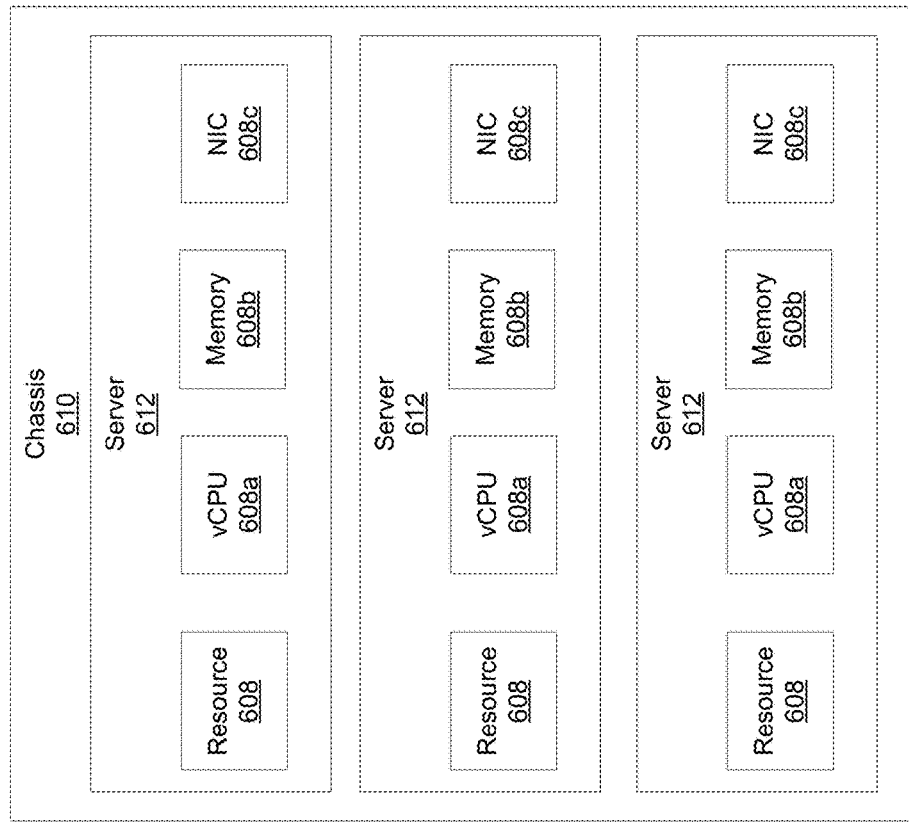

While FIG. 6A illustrates resources 608 as collectively contained in hardware platform 606, the configuration of hardware platform 606 may isolate, for example, certain memory 608c from other memory 608c. FIG. 6B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 6B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602*b*, using all available resources 608 to maximize the number of VMs 604 instantiated.

Consider, further, how many sessions each gateway VNF 602*a* and each PCRF VNF 602*b* may support. This may factor into which assignment of resources 608 is more efficient. For example, consider if each gateway VNF 602*a* supports two million sessions, and if each PCRF VNF 602*b* supports three million sessions. For the first configuration— three total gateway VNFs 602*a* (which satisfy the gateway requirement for six million sessions) and two total PCRF VNFs 602*b* (which satisfy the PCRF requirement for six million sessions)— would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)— would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life— especially for simple M2M devices—through enhanced wireless management.

While examples of a telecommunications system in which bulk data processing messages can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—bulk data processing (also referred to as bulk data collection)—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   partitioning, by a processing system including a processor, data into chunks, wherein the chunks are based on a cell identifier, the partitioning resulting in partitioned data;
   publishing, by the processing system, the partitioned data in a standardized format in a first topic;
   responsive to publishing the partitioned data in the standardized format in the first topic, obtaining, by the processing system, the partitioned data in the standardized format in a second topic; and
   publishing, by the processing system, the partitioned data in the standardized format to a subscriber of the second topic.

2. The method of claim 1, further comprising:
   transforming, by the processing system, the data into the standardized format based on a type of the data, wherein the publishing of the partitioned data in the standardized format in the first topic is based on the transforming.

3. The method of claim 2, further comprising:
   determining, by the processing system, the type of the data from a network device.

4. The method of claim 1, further comprising:
   obtaining, by the processing system, the data from a network device.

5. The method of claim 4, wherein the network device is a Mobility Management Entity.

6. The method of claim 4, wherein the network device is a base station.

7. The method of claim 4, wherein the network device is a mobile device.

8. The method of claim 4, wherein the data is streamed from the network device.

9. The method of claim 1, further comprising:
   obtaining, by the processing system, the data using a collection layer that comprises a plurality of collector devices that decodes the data into the standardized format from a vendor format.

10. The method of claim 1, further comprising:
    obtaining, by the processing system, the data using a messaging layer, wherein the messaging layer partitions the data in the standardized format into the first topic, and wherein the first topic is based on an International Mobile Subscriber Identity.

11. The method of claim 1, further comprising:
    publishing, by the processing system, the partitioned data in the standardized format to a subscriber of the first topic.

12. A system comprising:
    one or more processors; and
    memory coupled with the one or more processors, the memory storing executable instructions that when executed by the one or more processors cause the one or more processors to effectuate operations, the operations comprising:
    transforming data obtained from a wireless network into a standardized format;
    partitioning the data into chunks, wherein the chunks are based on a cell identifier, the partitioning resulting in partitioned data;
    publishing the partitioned data in the standardized format in a first topic;
    responsive to publishing the partitioned data in the standardized format in the first topic, obtaining the partitioned data in the standardized format in a second topic; and
    publishing the partitioned data in the standardized format to a subscriber of the second topic.

13. The system of claim 12, wherein the operations further comprise:
    obtaining the data from a network device coupled to the wireless network.

14. The system of claim 13, wherein the network device is a Mobility Management Entity.

15. The system of claim 13, wherein the network device is a base station.

16. The system of claim 13, wherein the network device is a mobile device.

17. The system of claim 12, wherein the data is streamed.

18. The system of claim 12, wherein the transforming comprises using a collection layer that comprises a plurality of collector devices that decodes the data into the standardized format from a vendor format.

19. A tangible computer readable storage medium storing computer executable instructions that when executed by a processing system including a processor cause said processing system to effectuate operations, the operations comprising:
    determining a type of obtained data;
    based on the determining, transforming the obtained data into a standardized format;
    partitioning the obtained data into chunks, resulting in partitioned data;
    publishing the partitioned data in the standardized format in a first topic;
    responsive to publishing the partitioned data in the standardized format in the first topic, obtaining the partitioned data in the standardized format in a second topic; and
    publishing the partitioned data in the standardized format to a subscriber of the second topic.

20. The tangible computer readable storage medium of claim 19, wherein the operations further comprise:
    obtaining the obtained data from a network device that includes a base station.

* * * * *